United States Patent [19]

Sommerlad

[11] Patent Number: 4,666,690
[45] Date of Patent: May 19, 1987

[54] METHOD FOR REMOVING SULFUR DIOXIDE FROM FLUE GASES

[75] Inventor: Robert E. Sommerlad, Cranford, N.J.

[73] Assignee: Foster Wheeler Development Corporation, Livingston, N.J.

[21] Appl. No.: 811,267

[22] Filed: Dec. 20, 1985

[51] Int. Cl.$^4$ .......................... C01B 17/00; B01J 8/00
[52] U.S. Cl. .................................. 423/242; 423/244; 423/640
[58] Field of Search .......... 423/242 A, 242 R, 244 A, 423/244 R, 640

[56] References Cited

U.S. PATENT DOCUMENTS

| | | | |
|---|---|---|---|
| 3,194,638 | 7/1965 | Neuville | 23/283 |
| 3,516,808 | 6/1970 | Curran et al. | 48/197 |
| 3,919,394 | 11/1975 | Selmeczi | 423/242 |
| 4,018,868 | 4/1977 | Knight | 423/244 |
| 4,047,891 | 9/1977 | Schuetz | 23/230 A |
| 4,309,393 | 1/1982 | Nguyen | 423/244 |
| 4,324,770 | 4/1982 | Bakke | 423/242 |
| 4,411,879 | 10/1983 | Ehrlich et al. | 423/640 |

Primary Examiner—Gregory A. Heller
Attorney, Agent, or Firm—Marvin A. Naigur; John E. Wilson; Warren B. Kice

[57] ABSTRACT

A method for removing sulfur compounds from flue gases in which a slurry of calcium oxide and water is formed and exothermically reacted to form a hydrate containing calcium hydroxide in substantially saturated solution. The calcium hydroxide is converted to relatively fine particles as the saturated liquid is flashed to steam. The fine particles are passed in a counter-flow relationship with the flue gases so that the sulfur compounds from the flue gases react with the calcium hydroxide in the particles to form calcium sulfate.

6 Claims, 1 Drawing Figure

U.S. Patent      May 19, 1987      4,666,690
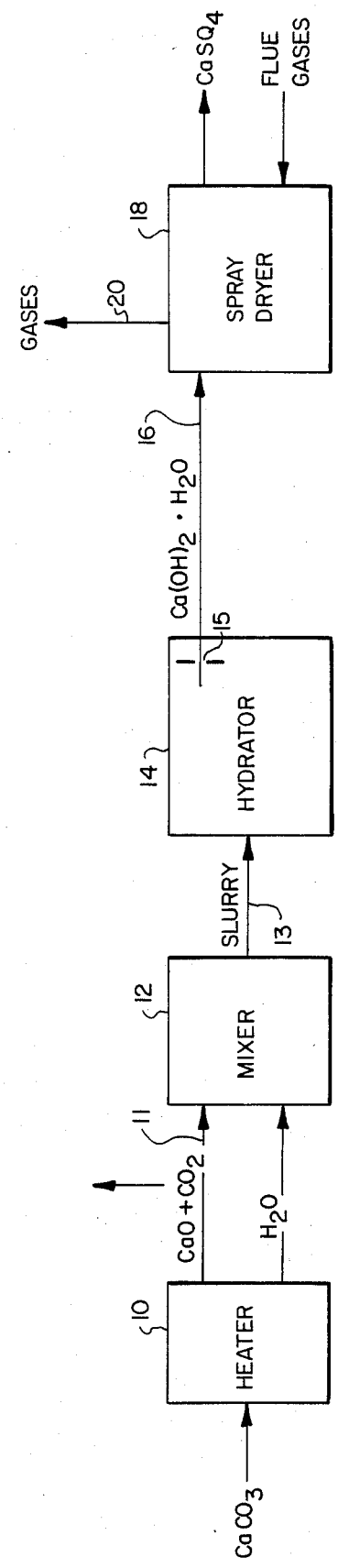

METHOD FOR REMOVING SULFUR DIOXIDE FROM FLUE GASES

BACKGROUND OF THE INVENTION

This invention relates to a method of removing sulfur compounds, primarily sulfur dioxide, from flue gases produced by the combustion of sulfur-containing fuels, and, more particularly to such a method in which the flue gases are mixed with a calcined stone, such as lime, which reacts with and thus removes, sulfur dioxide from the flue gases.

The combustion of sulfur-containing fuels, such as coal, produces a flue gas laden with sulfur compounds which must be treated to remove the sulfur compounds before it is discharged to the atmosphere in order to satisfy air pollution requirements. In prior art techniques of this type, lime is normally injected into such a system in a slurry by a high velocity dispenser, or injection, device. The lime reacts with the sulfur compounds in the gases to form a dry material which can be collected, resulting in a gas relatively free of sulfur compounds which can be discharged to atmosphere. However, in such prior art techniques the lime particles, due to their relatively large size, are relatively inefficient in capturing the sulfur compounds from the flue gases.

SUMMARY OF THE INVENTION

It is therefore an object of the present invention to provide a method for removing sulfur compounds from flue gases which is relatively efficient.

It is a further object of the present invention to provide a method of the above type in which the removing material is converted to a relatively fine particle size in order to increase its removal capability and therefore the efficiency of the system.

It is a still further object of the present invention to provide a method of the above type in which a slurry of lime, or the like, is formed which is hydrated and converted into relatively fine particles to serve as an efficient removal agent.

Toward the fulfillment of these and other objects the method of the present invention involves the formation of a slurry of calcium oxide and water which is exothermically reacted to form a hydrate containing calcium hydroxide. The calcium hydroxide is converted into relatively fine particles which are mixed with the flue gases so that the sulfur compounds from the flue gases react with the calcium compound to form calcium sulfate.

BRIEF DESCRIPTION OF THE DRAWINGS

The above brief description as well as further objects, features and advantages of the present invention will be more fully appreciated by reference to the accompanying drawing which is a schematic flow diagram illustrative of the method of the present invention.

DESCRIPTION OF THE PREFERRED EMBODIMENT

Referring to the drawing, the reference numeral 10 refers, in general, to a heater which receives pulverized calcinable stone from an external source. The term "calcinable stone" when used herein is intended to include one or more of the group consisting of magnesite, limestone, dolomite, dolomitic limestone and any other suitable calcinable material. For the purpose of example, the calcinable stone will be referred to as limestone, i.e. calcium carbonate.

The limestone is heated in the heater 10 in a conventional manner to produce calcium oxide (lime) and carbon dioxide. The carbon dioxide is vented and the calcium oxide is introduced, via a conduit 11, into a mixer 12, along with water. The mixer 12 operates in a conventional manner to form a slurry of the calcium oxide and water.

The slurry is then fed, via a conduit 13, to a pressure hydrator 14 of a conventional design, in which an exothermic reaction takes place between the calcium oxide and the water. This results in an increase in pressure and temperature in the hydrator 14 until a saturation condition exists. A hydrate containing calcium hydroxide is formed which is discharged from the hydrator 14 through a discharge orifice 15 and into an injection line 16. The adiabatic expansion of the saturated liquid (water) as it passes through the orifice flashes it to steam and explodes, or breaks up, the calcium hydroxide into very fine particles of sub-micron size. The steam then acts as a carrier for the fine particles of calcium hydroxide as the mixture is passed through the injection line 16 before being injected into a spray dryer 18.

Sulfur compound-containing flue gases from a combustion system or the like, are introduced into the spray dryer 18, with the arrangement being such that they pass in a counter-flow relationship to the flow of fine particles of calcium hydroxide. As a result of the intimate contact thus brought about between the calcium hydroxide and the flue gases laden with sulfur compounds, the following reactions take place:

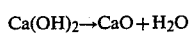

$$Ca(OH)_2 \rightarrow CaO + H_2O \qquad 1.$$

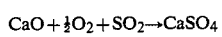

$$CaO + \tfrac{1}{2}O_2 + SO_2 \rightarrow CaSO_4 \qquad 2.$$

In the latter reaction (#2), the sulfur compounds are reacted by the calcium oxide to form calcium sulfate, a dry material which can be collected in conventional dust collecting equipment and disposed of in any known manner. The remaining relatively clean flue gases are discharged from the spray dryer 18, via a discharge conduit 20, to the atmosphere.

It is understood that pumps and additional conduits and injection lines may be provided where needed for transporting the slurry and the calcium hydroxide in accordance with the foregoing.

Several advantages result from the method of the present invention. For example, the breaking up of the particles of calcium hydroxide into finer particles exposes more surface area of the calcium hydroxide to the flue gases and thus increases the efficiency of the system.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed:

1. A method for removing sulfur oxide compounds from flue gases comprising the steps of forming a slurry of calcium oxide and water, exothermically reacting said slurry of calcium oxide and water to form a hydrate containing saturated water and calcium hydroxide, flashing said saturated water to steam to break up the calcium hydroxide into very fine particles and pasing said fine particles of calcium hydroxide in a counter-flow relationship with said flue gases so that said sulfur oxide compounds from said flue gases are reacted with said calcium hydroxide particles.

2. The method of claim 1 wherein said step of flashing comprises the step of passing said hydrate through an orifice to adiabatically expand said water.

3. The method of claim 1 wherein said steam acts as a carrier for said particles during said step of passing.

4. The method of claim 3 wherein said step of passing comprises the steps of injecting said particles into a spray dryer and introducing said flue gases into said spray dryer in a counter-flow relationship to said particles.

5. The method of claim 1 further comprising the step of heating calcium carbonate to form said calcium oxide and carbon dioxide, and venting said carbon dioxide, before said step of forming.

6. The method of claim 1 wherein said step of reacting comprises the step of introducing said calcium oxide and water into a pressure hydrator in which said exothermic reaction takes place resulting in an increase in temperature and pressure in said hydrator.

* * * * *